United States Patent
Salyer

(10) Patent No.: US 6,493,507 B2
(45) Date of Patent: Dec. 10, 2002

(54) WATER HEATING UNIT WITH INTEGRAL THERMAL ENERGY STORAGE

(76) Inventor: Ival O. Salyer, 6325 Shady Knoll Dr., Dayton, OH (US) 45414

(*) Notice: Subject to any disclaimer, the term of this patent is extended or adjusted under 35 U.S.C. 154(b) by 0 days.

(21) Appl. No.: 09/881,941

(22) Filed: Jun. 15, 2001

(65) Prior Publication Data

US 2001/0028791 A1 Oct. 11, 2001

Related U.S. Application Data

(63) Continuation-in-part of application No. 09/507,584, filed on Feb. 21, 2000, which is a continuation-in-part of application No. 08/791,001, filed on Jan. 30, 1997, now Pat. No. 6,047,106.

(51) Int. Cl.[7] .................................. F24H 7/02
(52) U.S. Cl. ...................... 392/341; 392/456; 126/400; 165/10; 165/902
(58) Field of Search ................ 392/449, 450, 392/451, 452, 453, 454, 341, 456; 165/10, 902, 158; 126/400

(56) References Cited

U.S. PATENT DOCUMENTS

| 2,911,513 | A | | 11/1959 | MacCracken |
| 3,195,621 | A | * | 7/1965 | Geuns et al. ............. 165/10 |
| 3,401,662 | A | | 9/1968 | Wickersham |
| 3,485,216 | A | | 12/1969 | Lawrence |
| 4,182,398 | A | | 1/1980 | Salyer et al. |
| 4,362,207 | A | | 12/1982 | Farfaletti-Casali et al. |
| 4,617,332 | A | | 10/1986 | Salyer et al. |
| 4,711,813 | A | | 12/1987 | Salyer |
| 4,797,160 | A | | 1/1989 | Salyer |
| 4,825,939 | A | | 5/1989 | Salyer et al. |
| 4,964,402 | A | | 10/1990 | Grim et al. |
| 5,053,446 | A | | 10/1991 | Salyer |
| 5,075,343 | A | | 12/1991 | Blount |
| 5,106,520 | A | | 4/1992 | Salyer |
| 5,211,949 | A | | 5/1993 | Salyer |
| 5,254,380 | A | | 10/1993 | Salyer |
| 5,282,994 | A | | 2/1994 | Salyer |
| 5,387,780 | A | * | 2/1995 | Riley ..................... 219/688 |
| RE34,880 | E | | 3/1995 | Salyer |
| 5,565,132 | A | | 10/1996 | Salyer |
| 5,687,706 | A | | 11/1997 | Goswami et al. |
| 5,694,515 | A | | 12/1997 | Goswami et al. |
| 5,804,266 | A | * | 9/1998 | Salyer ..................... 165/10 |
| 5,950,450 | A | * | 9/1999 | Meyer et al. ........... 62/235.1 |
| 6,047,106 | A | | 4/2000 | Salyer |

FOREIGN PATENT DOCUMENTS

| CH | 468602 | | 3/1969 |
| FR | 2554217 A | * | 5/1985 |
| FR | 2570476 | | 3/1986 |
| GB | 398927 | | 9/1933 |
| GB | 1196336 | | 6/1970 |
| GB | 2035764 | | 6/1980 |
| JP | 0107045 | | 4/1989 |

OTHER PUBLICATIONS

Salyer, Ival O. and Sircar, Anil K., "Phase Change Materials for Heating and Cooling of Residential Buildings and Other Applications" from the University of Dayton Research Institute.

Salyer, Ival O. et al., "Advanced Phase–Change Materials for Passive Solar Storage Applications" Society of Automotive Engineers, Inc. 1985.

* cited by examiner

Primary Examiner—Jiping Lu
(74) Attorney, Agent, or Firm—Killworth, Gottman, Hagan & Schaeff, L.L.P.

(57) ABSTRACT

The present invention is directed to a water heater which includes a phase change material having a freezing/melting temperature from about 30° C. to about 90° C. The water heater include a source of water, a heating element for heating the water, a heat exchange unit which contains the material, and a plurality of heat exchange tubes positioned in the heat exchange unit, which tubes are in heat transfer relation to the phase change material so that heat stored in the material can be transferred to the water. The phase change material is preferably heated from the top down to accommodate the changes in volume during thermocycling.

24 Claims, 4 Drawing Sheets

WATER HEATING UNIT WITH INTEGRAL THERMAL ENERGY STORAGE

CROSS REFERENCE TO RELATED APPLICATIONS

This application is a continuation-in-part of U.S. application Ser. No. 09/507,584, filed Feb. 21, 2000, which is a continuation-in-part of U.S. application Ser. No. 08/791,001, filed Jan. 30, 1997, now U.S. Pat. No. 6,047,106.

BACKGROUND OF THE INVENTION

Conventional water heaters provide heated water by storing heat energy in the water. Because the heat energy is stored in the water, a large portion of the heater must be dedicated to storing the heated water until it is used. Typically, water stores approximately 10 calories/gram of heat per 10° C. increments. By requiring a large portion of the heater for storage of heated water, the water heater must be of reasonable size to store enough heated water for use in a standard residential environment. Typical residential water heaters have a 50–60 gallon capacity. For use in buildings and industry, water heaters must be even larger.

Water heaters consume a high percentage of residential energy heating water for bathing, washing dishes, washing clothes and heating homes and offices. In homes heated by electricity, the consumption of electric power is even greater. Overall, a large imbalance in electric power usage exists during the day time due primarily to the large amounts of power consumed by industry, businesses and public transportation. To compensate for the extensive day time use of electric power, utility companies provide generating capacity sufficient to supply day time usage, leaving unused capacity available for the night hours.

Thus, a need has arisen in the art for a water heater which can more efficiently heat water, which can make effective use of utilities during off-peak hours to minimize building and household power consumption and which would consequently reduce building and household utility costs.

Water heaters are known which utilize phase change materials to heat water more effectively. Such phase change materials have a latent heat which is greater than the sensible heat of liquid water. A water heater utilizing a phase change material is described in my U.S. Pat. No. 6,047,106. The heater includes heat exchange tubes positioned in a heat exchange unit containing the phase change material such that the heat stored in the phase change material can be transferred to water.

However, a disadvantage of the use of phase change materials is that they expand upon melting and contract upon freezing. Where neat phase change materials are used, a substantial change in volume occurs which can lead to rupture of the container in which the phase change materials are held. It is possible to eliminate significant changes in volume during thermocycling by using modified formulations of phase change materials such as a mixture of a phase change material/silica dry powder, or a melt mix of phase change material/high density polyethylene/ethylene vinyl acetate/silica. However, such mixes contain only about 60% by weight phase change material. Compositions containing a higher content of phase change materials are desirable in order to provide a higher level of thermal storage.

Accordingly, there is still a need in the art for a water heater utilizing a phase change material to effectively heat water which provides improved thermal storage without the problems of volume changes due to melting and freezing.

SUMMARY OF THE INVENTION

The present invention meets that need by providing a water heater which can more effectively heat water by utilizing greater amounts of phase change materials in a container in which heating of the phase change material is initiated at the top of the unit and cooling is initiated at the bottom of the unit. By operating in this manner, the volume of the phase change material in the container is effectively controlled so to as to provide sufficient space for expansion and contraction.

According to one aspect of the present invention, a water heater for heating water is provided comprising a source of water, a top water reservoir and a bottom water reservoir, a heating element for heating the water, and a heat exchange unit having an upper section and a lower section and outer walls, where the heat exchange unit contains a phase change material therein. A plurality of heat exchange tubes are positioned in the heat exchange unit with the phase change material located between and around the heat exchange tubes to substantially fill any spaces between the heat exchange tubes. The tubes are in heat transfer relation to the phase change material and in fluid connection with the source of water so that the water heated by the heating element flows through the tubes and heats the phase change material. The heat stored in the phase change material is then transferred through the tubes to water flowing therethrough at nearly constant temperatures equivalent to the freezing/melting temperature of the phase change material.

The water heater preferably further includes a shell having an exterior surface, where the heat exchange unit is enclosed in the shell, and a layer of insulation is included on the exterior surface of the shell. Preferably, the insulation has an "R" value of at least about 10. The insulation is preferably vacuum panel insulation having an "R" value of at least about 20 per inch of thickness.

The heating of the phase change material is initiated in the upper section of the heat exchange unit. In one embodiment of the invention, the phase change material is heated by heating the water in the top water reservoir. In this embodiment, the heating element comprises a resistance heating element positioned in the top water reservoir.

In an alternative embodiment of the invention, the heating element comprises a plurality of resistance heating elements positioned on the outer walls of the heat exchange unit. The heating elements are activated sequentially from the top to the bottom.

By heating the phase change material from the top to the bottom, the phase change material melts and expands into free space at the top of the unit.

The phase change material preferably comprises 100% by weight of a linear crystalline alkyl hydrocarbon having a melting/freezing temperature from about 20° C. to 100° C., and more preferably, from about 30° C. to 90° C.

In a preferred embodiment, the phase change material includes from about 2 to 10% by weight of a polymer selected from the group consisting of EPDM, polyisobutylene, polyisoprene, polybutadiene, chlorinated polyethylene, polyalkyl acrylate, and polyalkyl methacrylate rubber. More preferably, the phase change material includes from about 2 to 10% by weight of a polymer selected from the group consisting of low density polyethylene, crystalline ethylene/propylene copolymers, ethylene/vinyl acetate copolymers, ethylene/methyl acrylate copolymers ethyl/methacrylate copolymers, ethylene/glycol polymers, and polyethylene oxide. The polymers act as a thickening agent to reduce the potential for leakage.

In an alternative embodiment of the invention, the phase change material is in the form of a gel comprising from about 80 to 90% by weight of a linear crystalline alkyl hydrocarbon and about 10 to 20% by weight silica particles.

In another alternative embodiment, the phase change material is imbibed in a porous material such as an open cell foam.

The phase change material may also include from about 5 to 15% by weight carbon black to increase the thermal conductivity of the phase change material.

The phase change material may also include from about 5 to about 50% by weight of a metal selected from the group consisting of aluminum and copper in order to improve heat transfer.

Accordingly, it is an object of the present invention to provide a water heater which employs large amounts of a phase change material which is heated from top to bottom. These, and other objects and advantages of the present invention, will become apparent from the following drawings, detailed description and claims.

DESCRIPTION OF THE INVENTION

Figure 1:
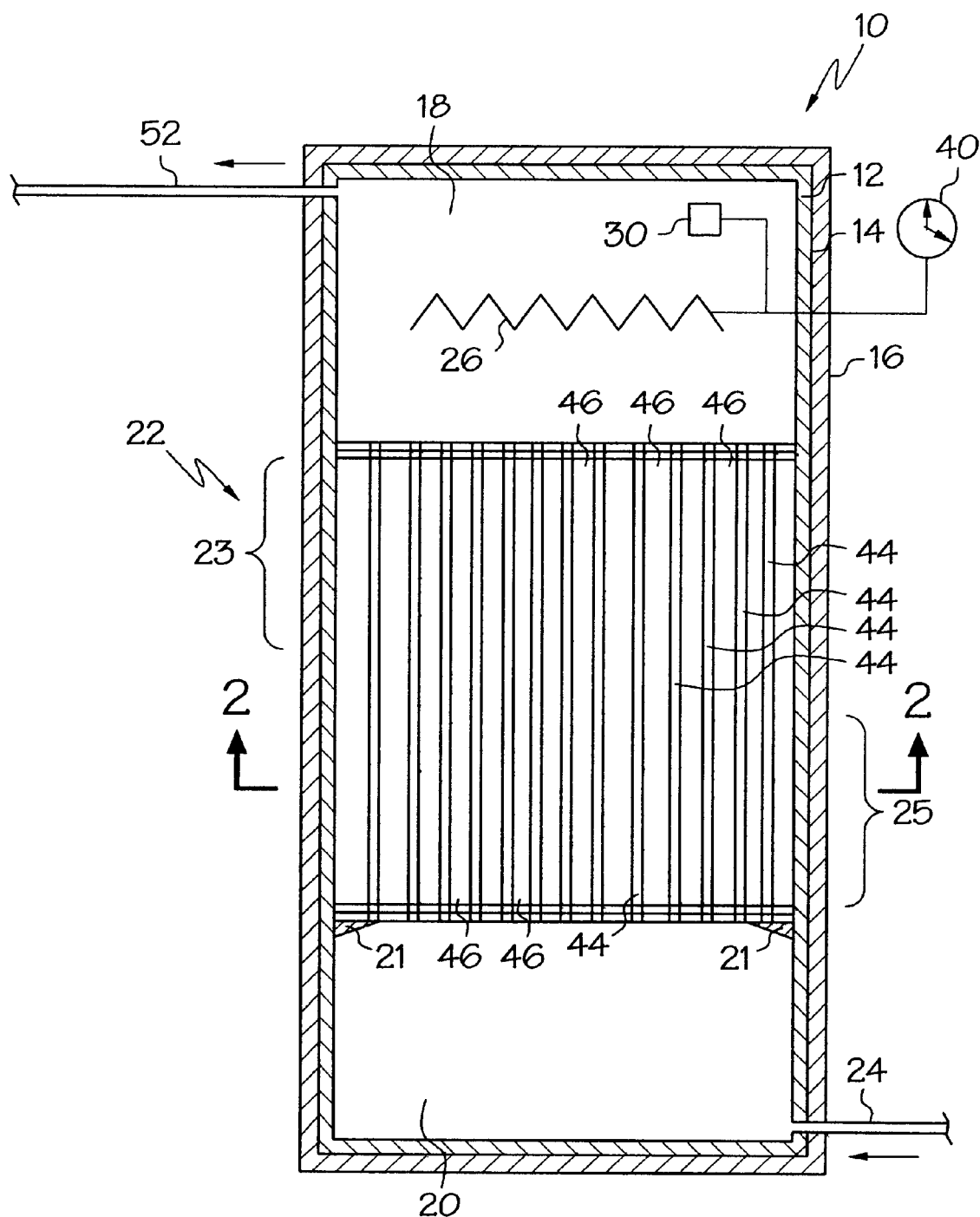
FIG. 1 is a partial cross-sectional view of one embodiment of the water heater of this invention.

FIG. 1 presents a partial cross sectional view of the water heater 10 of this invention. The water heater 10 comprises a shell 12 having an exterior surface 14 which is surrounded by an insulation material 16. The shell 12 can be any shape and is desirably cylindrical. The insulation material 16 preferably covers the entire exposed outside surface 14 of the shell 12. Preferably, the insulation material 16 will have an "R" value of at least about 10. More preferably, the insulation material 16 is vacuum panel insulation having an "R" value of 20 per inch of thickness or greater. Vacuum panel insulation suitable for use in the present invention is described in U.S. Pat. Nos. 5,943,876 and 6,192,703, incorporated herein by reference.

The water heater 10 further includes a top water reservoir 18, a bottom water reservoir 20, and a heat exchange unit 22. Water is supplied to the water heater 10 by means of a water inlet line 24. A water outlet line 52 is connected to the top water reservoir 18 to allow heated water to flow from the water heater 10.

In the embodiment shown in FIG. 1, the water heater includes a heating element 26 positioned in the top water reservoir which is connected to a power supply (not shown). To control the water temperature of the water heated by the heating element 26, the water heater may also include a thermostat 30 connected to the power supply to prevent overheating of the water by the heating element. The heating element 26 preferably comprises a resistance heating element which utilizes either alternating or direct current.

Heat exchange unit 22 comprises an upper section 23 and a lower section 25. Heat exchange unit 22 is self contained and mounted on a ledge 21 inside of shell 12. The heat exchange unit 22 includes a plurality of heat exchange tubes 44 and a phase change material 46. The heat exchange tubes 44 are preferably positioned substantially vertically in the heat exchange unit. The heat exchange tubes 44 can have any cross sectional shape and are desirably formed from any heat conducting material. Most desirably, the tubes 44 are formed from either copper or aluminum. The heat exchange tubes 44 can be maintained in position by being banded together by at least one band and/or being supported by a sealed top cover and bottom cover (not shown), each having a plurality of openings.

The phase change material 46 is positioned in the heat exchange unit 22 such that the phase change material 46 is in heat transfer relation to the heat exchange tubes 44. The phase change material 46 is contained in the heat exchange unit 22 such that it will not come into contact with water when the water heater is filled. The containment of phase change material 46 in the heat exchange unit 22 is described below.

The water heater 10 may also include a timer 40 connected to the power supply to control the power usage of the heater 10 during designated time periods, e.g. turning off the power supply during peak usage hours.

Figure 2:
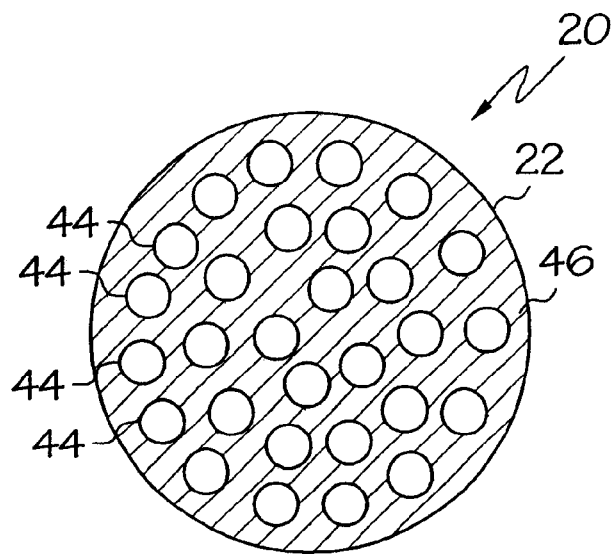
FIG. 2 is a cross-sectional view along line 2—2 of FIG. 1 of one embodiment of the heat exchange unit.

FIG. 2 presents a cross-sectional view of heat exchange unit 22 along line 2—2 in FIG. 1. As can be seen in FIG. 2, the phase change material 46 is located between and around the heat exchange tubes 44 to substantially fill any spaces between the heat exchange tubes 44. The phase change material 46 is located in heat transfer contact with the heat exchange tubes 44 so that as water flows through heat exchange tubes 44, heat can be transferred from the phase change material 46 to the water and vice versa. In this embodiment, the heat exchange tubes 44 are spaced so that a maximum amount of the phase change material 46 can be placed in the heat exchange unit 22.

Figure 2A:
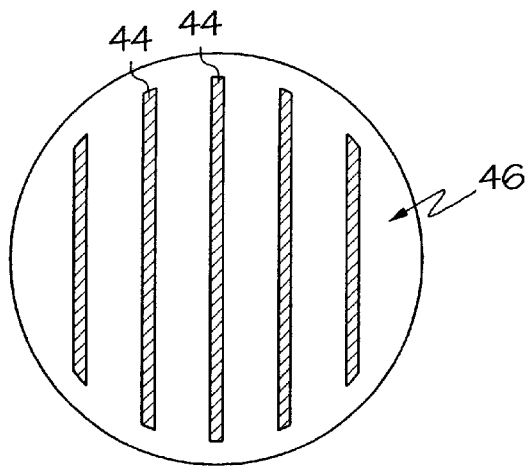
FIGS. 2A–2C are cross-sectional views of alternative embodiments of the heat exchange unit.
Figure 2B:
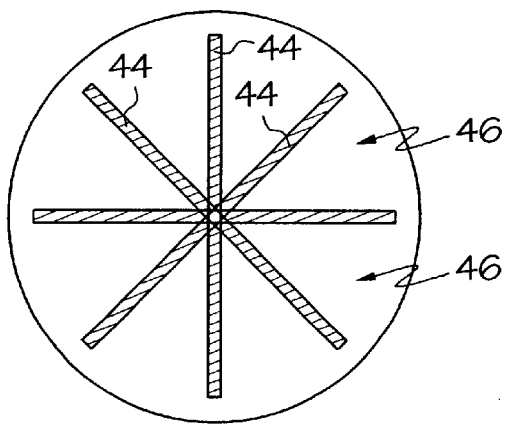
Figure 2C:
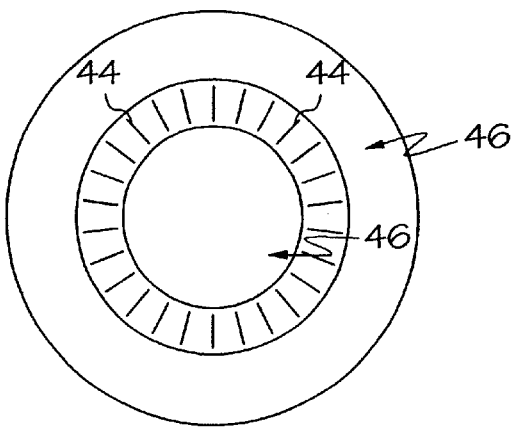

FIGS. 2A through 2C illustrate alternative embodiments of the heat exchange unit 22 in which the heat exchange tubes are provided in a number of different positions for heat transfer. As shown in FIG. 2A, the heat exchange tubes 44 are in the form of narrow rectangular tubes surrounded by the phase change material 46. FIG. 2B illustrates an alternative arrangement of the rectangular heat exchange tubes. FIG. 2C illustrates yet another alternative embodiment in which the heat exchange tubes 44 are in the form of annular tubes.

Figure 3:
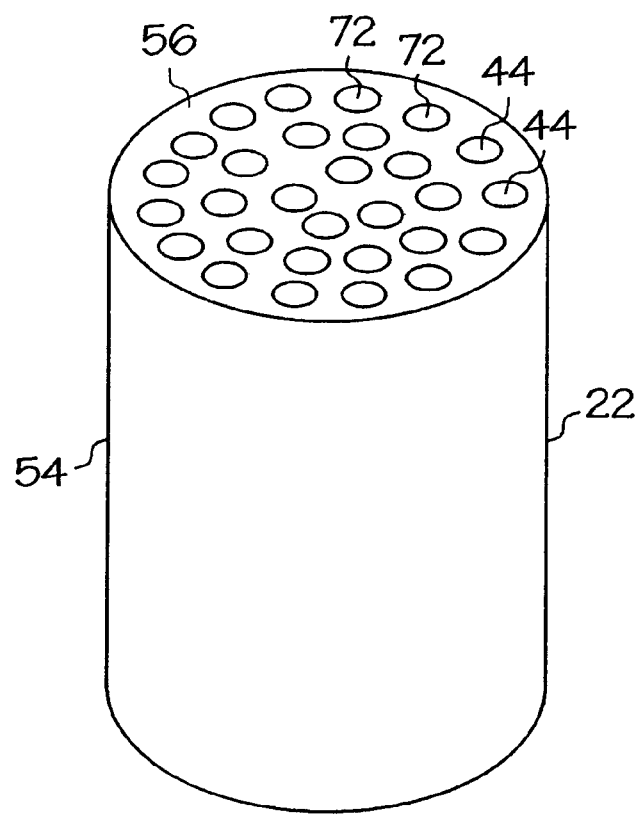
FIG. 3 is perspective view of the embodiment of the heat exchange unit shown in FIG. 2.

FIG. 3 presents a perspective view of the heat exchange unit 22 shown in FIG. 2. The heat exchange tubes 44 are preferably contained in a sealed container 54 which is covered by top cover 56 and a bottom cover (not shown). Openings 72 correspond in position with the open ends of tubes 44 to allow water to flow through container 54. By providing sealed cover 56 and the bottom cover to contain the heat exchange tubes 44, the phase change material 46 is prevented from becoming wetted by the water while the water heater 10 is in use. Further, by providing the heat exchange tubes 44 and the phase change material 46 in container 54, heat exchange unit 22 can be placed into and removed from shell 12 of water heater 10 as a single unit.

Figure 4:
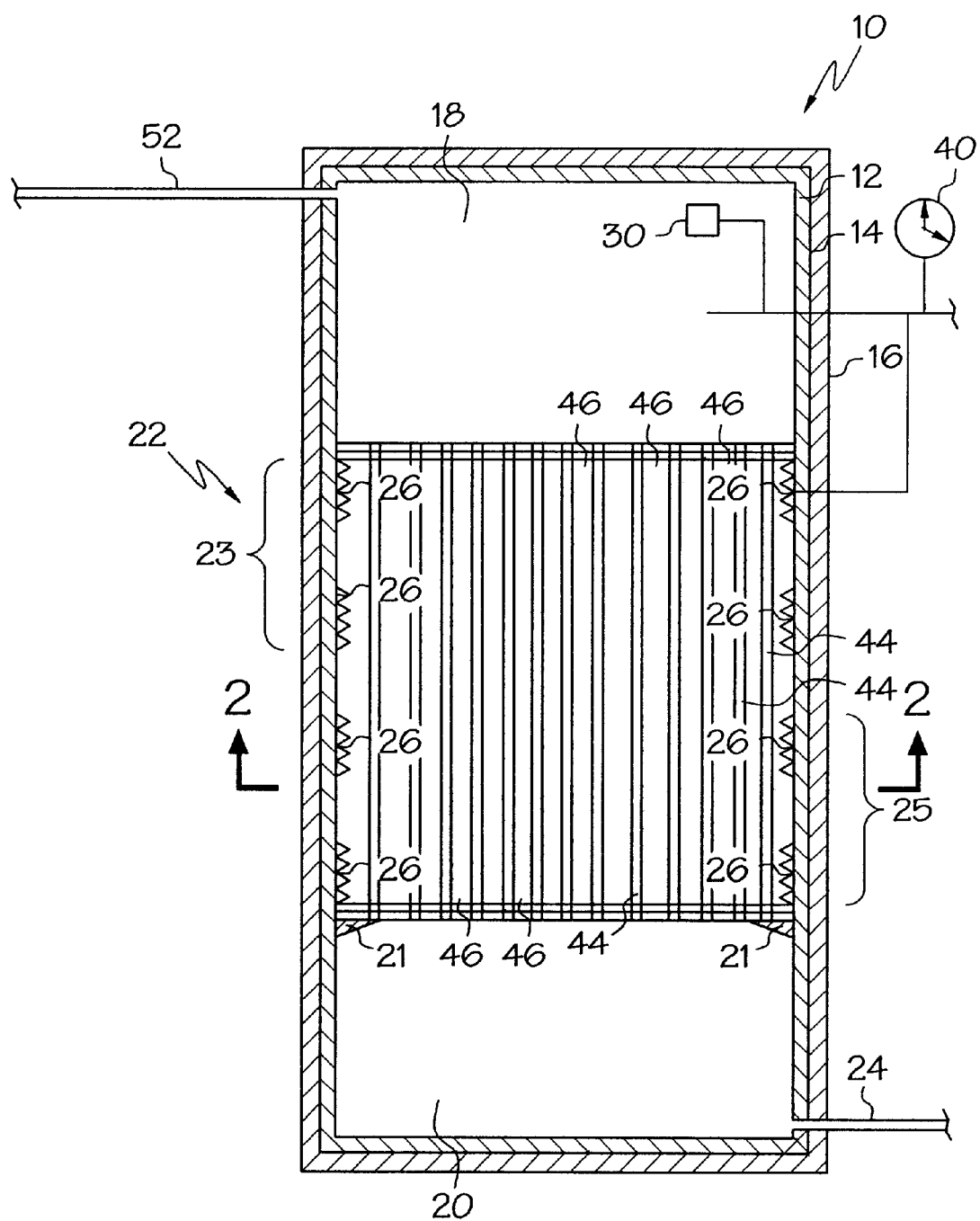
FIG. 4 is a cross-sectional view of an alternative embodiment of the water heater.

FIG. 4 illustrates an alternative embodiment of the water heater in which the heating element comprises a plurality of resistance heating elements 26 positioned along the outer shell 12 of the heat exchange unit 22. As described above with regard to FIG. 1, the water heater may also include a thermostat 30 connected to the power supply.

Referring now to FIG. 1, the water heater 10 of the present invention functions in the following manner. Cool water is supplied to the heater 10 through water inlet line 24 into shell 12 such that thermocycling is initiated by cooling the phase change material from the bottom to the top. This causes the phase change material to decrease in volume, providing free space at the top of the container. Once the heater is filled, the water in the top water reservoir 18 is heated by heating element 26. The temperature of heating element 26 can be monitored by thermostat 30 to prevent overheating of the water and/or the phase change material 46. The heated water is then passed through the heat exchange unit 22. The water flows from the upper section 23 of the heat exchange unit 22 to the lower section 25 through heat exchange tubes 44. In the heat exchange unit 22, heat from the heated water is transferred to the phase change material 46. As the hot water essentially is maintained at the top of the heater, when the phase change material melts, it will expand into the free space at the top of the unit.

When the water heater 10 is not in operation, e.g., during peak times of power usage, the phase change material in the heat exchange unit 22 heats the water. When the temperature of the water approaches the freezing/melting point of the phase change material 46, heat is transferred from the phase change material 46 to the water. As the heat is transferred to the water, the temperature of the water is raised. Because the latent heat of the phase change material 46 is greater than the sensible heat of water, phase change material 46 provides a more efficient storage material for storing heat in heater 10 than water alone as in conventional water heaters. Further, the heated water is supplied by water heater 10 at nearly constant temperature equivalent to the freezing point of the phase change material 46. This "plateau" of constant temperature remains until the latent heat capacity of the phase material 46 has been used up. This further differs from conventional water heaters in which heated water is delivered on a thermocline of descending temperature.

In the alternative embodiment represented in FIG. 4, the heat exchange unit 22 is heated by means of resistance heating elements 26 which are preferably activated from the top to the bottom such that heating of the phase change material is initiated in the upper section 23 of the heat exchange unit 22. After the phase change material reaches its melting temperature, the successive heating elements are activated until the temperature of the phase change material in the lower section 25 is also above the melting point of the phase change material.

The present invention utilizes phase change materials 46 in a variety of forms. The phase change materials used should preferably have melting/freezing temperatures from about 20° C. to about 100° C., and more preferably, from about 30° C. to about 90° C., to efficiently maintain the temperature of the water at a temperature which provides a sensation of warmth when touched. The phase change materials useful with this invention will have a latent heat greater than the sensible heat of liquid water. Desirably, they will have a heat capacity of at least about 25 cal/g.

The phase change materials store heat energy from the water and provide heat to the water when necessary. Phase change materials may be repeatedly converted between solid and liquid phases to utilize their latent heats of fusion to absorb, store and release heat during such phase conversions. These latent heats of fusion are greater than the sensible heat capacities of water. For example, in phase change materials, the amount of energy absorbed upon melting or released upon freezing is much greater than the amount of energy absorbed or released upon increasing or decreasing the temperature of water over an increment of 10° C. In fact, phase change materials can store approximately three to five times more energy than water. Thus, by using phase change materials to store heat instead of storing heat in the water, the water heater of the present invention can provide three to five times more heated water than a conventional water heater. Alternatively, the water heater could be ⅓–⅕ the size of a conventional water heater and still provide the same amount of heated water.

Upon melting and freezing, the phase change material absorbs and releases substantially more energy per unit weight than a sensible heat storage material that is heated or cooled over the same temperature range. In contrast to a sensible heat storage material which absorbs and releases energy essentially on a thermocline over a broad temperature range, the phase change material absorbs and releases a large quantity of energy in the vicinity of its melting/freezing point. Additionally, the heated water is delivered at a nearly constant temperature which can be selected to be in the temperature range that is comfortable for bathing and other household activities.

By using phase change materials to store and release heat energy from and to water, the temperature of the water produced by the water heater can be controlled through selection of the phase change material based upon its freezing/melting temperature. For example, in home use, a useful water temperature typically does not exceed about 60° C., thus a phase change material having a melting temperature of approximately 70° C. would be ideal. In situations where higher water temperatures are desired, then phase change materials with higher freezing/melting temperatures could be used.

The phase change material preferably comprises crystalline alky hydrocarbons having a carbon chain of about $C_{14}$ or greater which include a number of commercially available waxes. Suitable waxes include Shellwax® 120, Shellwax® 300, and Shellwax® 176, all available from Shell Oil Co., Boron R-152, available from Standard Oil of Ohio, and Aristowax® 143 and Paraffin 150, available from Exxon.

Because the water heater of the present invention heats the phase change material from the top down, larger amounts of phase change material may be used, including 100% by weight. However, because of potential leakage, it is preferred that the phase change material be thickened with about 5% or less of a polymeric thickening agent. Suitable amorphous thickening agents include EPDM rubbers, polyisobutylene, polyisoprene (natural and synthetic rubber), polybutadiene, chlorinated polyethylene (Hypalon rubber), polyalkyl acrylate, and polyalkyl methacrylate rubbers.

More preferred for use in the present invention are crystalline polymeric thickening agents which have melting and freezing temperatures between about 30 and 90° C. Such polymers include low density polyethylene, crystalline ethylene/propylene copolymers, ethylene/vinyl acetate copolymers (containing 5 to 30% by weight vinyl acetate), ethylene/methyl acrylate copolymers, ethylene/methyl methacrylate copolymers, high molecular weight ethylene/glycol polymers, and polyethylene oxide. The use of crystalline polymeric thickening agents provides the desired thickening with little or no reduction in the thermal energy storage of the phase change composition.

In an alternative embodiment of the invention, the phase change material is in the form of a gel comprising from about 80 to 90% by weight of a linear crystalline alkyl hydrocarbon and about 10 to 20% by weight silica particles. An example of a suitable gel is described in U.S. Pat. No. 6,079,404, filed Jun. 27, 2000, entitled GEL COMPOSITIONS FOR THERMAL ENERGY STORAGE.

The phase change material may also include from about 5 to 15% by weight carbon black to increase the thermal conductivity of the phase change material. Preferred for use in the present invention is an electrical conducting carbon black such as Cabot XC-72R.

The phase change material may also include from about 5 to about 50% by weight of a metal such as aluminum or copper to improve heat transfer. For example, metal particles could be incorporated into the phase change material.

In another embodiment of the invention, the phase change material may be imbibed into a porous material such as a foam which is designed to fit around the heat exchange tubes. The porous material may be imbibed with a linear alkyl hydrocarbon phase change material such as Polywax 500, commercially available from Petrolite Corp. Alternatively, the porous material may be imbibed with a salt hydrate phase change material such as trisodium phosphate dodecahydrate or trisodium monohydrogen phosphate dodecahydrate.

Suitable foams for use as porous materials in the present invention include open-celled polyurethane vacuum insulation foams available from Huntsman-ICI, which have approximately 94% empty space and Dow open-celled polystyrene foams, available from Dow Chemical under the designation INSTILL™, which have about 92% empty space (based on a density for polystyrene of 1.06 and the foam weight of 5.5 pounds per cubic foot). Another suitable foam is Cabot silica foam, available from Cabot Corporation under the designation NANO-GEL. These open-celled nano-sized pore foams are preferably filled via vacuum imbibing which fills the space to about 100%. Other porous materials may also be used such as non-woven mats, particle board, and the like.

The alkyl hydrocarbon phase change material may also be permeated into crosslinked sheets or pellets of high density polyethylene or polypropylene. The phase change material may be used in concentrations up to about 85% by weight. Oozing of the phase change material during thermocycling can be minimized by adding a polymeric thickening agent as described above. This form of the phase change material is preferably used in the heat exchange design shown in FIG. 2A in which the exchange tubes are in the form of thin rectangular tubes arranged in parallel. This design enables crosslinked sheets or imbibed porous foams to be efficiently packed into the heat exchange unit.

While certain representative embodiments and details have been shown for purposes of illustrating the invention, it will be apparent to those skilled in the art that various changes in the compositions and apparatus disclosed herein may be made without departing from the scope of the invention, which is defined in the appended claims.

What is claimed is:

1. A water heater for heating water comprising:
   a source of water;
   a top water reservoir and a bottom water reservoir;
   a heating element for heating said water;
   a heat exchange unit having an upper section and a lower section and outer walls, said heat exchange unit containing a phase change material therein; and
   a plurality of heat exchange tubes positioned in said heat exchange unit with said phase change material located between and around said heat exchange tubes to substantially fill any spaces between said heat exchange tubes, said tubes being in heat transfer relation to said phase change material and in fluid connection with said source of water so that the water heated by said heating element flows through said tubes and heats said phase change material and thereafter the heat stored in said phase change material is transferred through said tubes to water flowing therethrough at nearly constant temperatures equivalent to the freezing/melting temperature of said phase change material; wherein heating of said phase change material is initiated in the upper section of said heat exchange unit.

2. The water heater of claim 1 wherein said water is heated at said top water reservoir.

3. The water heater of claim 1 wherein said heating element comprises a resistance heating element positioned in said top water reservoir.

4. The water heater of claim 1 wherein said heating element comprises a plurality of resistance heating elements positioned on the outer walls of said heat exchange unit.

5. The water heater of claim 4 wherein said heating elements are activated sequentially from the top to the bottom.

6. The water heater of claim 1 wherein said phase change material comprises a linear crystalline alkyl hydrocarbon having a melting/freezing temperature from about 20° C. to 100° C.

7. The water heater of claim 6 wherein said phase change material includes from about 2 to 10% by weight of a polymer selected from the group consisting of EPDM, polyisobutylene, polyisoprene, polybutadiene, chlorinated polyethylene, polyalkyl acrylate, and polyalkyl methacrylate rubber.

8. The water heater of claim 6 wherein said phase change material includes from about 2 to 10% by weight of a polymer selected from the group consisting of low density polyethylene, crystalline ethylene/propylene copolymers, ethylene/vinyl acetate copolymers, ethylene/methyl acrylate copolymers ethylene/methyl methacrylate copolymers, ethylene/glycol polymers, and polyethylene oxide.

9. The water heater of claim 6 wherein said phase change material includes from about 5 to 15% by weight carbon black.

10. The water heater of claim 6 wherein said phase change material includes from about 5 to about 50% by weight of a metal selected from the group consisting of aluminum and copper.

11. The water heater of claim 6 wherein said phase change material has been imbibed into a porous material.

12. The water heater of claim 11 wherein said porous material comprises an open cell foam.

13. The water heater of claim 6 wherein said phase change material comprises 100% by weight of said linear crystalline alkyl hydrocarbon.

14. The water heater of claim 1 wherein said phase change material comprises a linear crystalline alkyl hydrocarbon having melting/freezing temperature from about 30° C. to 90° C.

15. The water heater of claim 1 wherein said phase change material is in the form of a gel comprising from about 80 to 90% by weight of a linear crystalline alkyl hydrocarbon and about 10 to 20% by weight silica particles.

16. The water heater of claim 1 further including a shell having an exterior surface, said heat exchange unit being enclosed in said shell, and a layer of insulation on the exterior surface of said shell.

17. The water heater of claim 16 wherein said insulation has an "R" value of at least about 10.

18. The water heater of claim 16 wherein said insulation is vacuum panel insulation having an "R" value of at least about 20 per inch of thickness.

19. The water heater of claim 1 wherein said phase change material comprises a linear crystalline alkyl hydrocarbon which has been imbibed into a porous material.

20. The water heater of claim 1 wherein cooling of said phase change material is initiated in the lower section of said heat exchange unit.

21. A water heater for heating water comprising:

a source of water, a top water reservoir and a bottom water reservoir, a heating element for heating said water, wherein said heating element comprises a plurality of resistance heating elements positioned on the outer walls of said heat exchange unit, said heating elements being activated sequentially from the top to the bottom;

a heat exchange unit having an upper section and a lower section and outer walls, said heat exchange unit containing a phase change material therein; and a plurality of heat exchange tubes positioned in said heat exchange unit with said phase change material located between and around said heat exchange tubes to substantially fill any spaces between said heat exchange tubes, said tubes being in heat transfer relation to said phase change material and in fluid connection with said source of water so that the water heated by said heating element flows through said tubes and heats said phase change material and thereafter the heat stored in said phase change material is transferred through said tubes to water flowing therethrough at nearly constant temperatures equivalent to the freeing/melting temperature of said phase change material; wherein heating of said phase change material is initiated in the upper section of said heat exchange unit.

22. A water heater for heating water comprising:

a source of water;

a top water reservoir and a bottom water reservoir, a heating element for heating said water;

a heat exchange unit having an upper section and a lower section and outer walls, said heat exchange unit containing a phase change material therein comprising a linear crystalline alkyl hydrocarbon having a melting/freezing temperature from about 20° C. to 100° C., said phase change material including from about 2 to 10% by weight of a polymer selected from the group consisting of EPDM, polyisobutylene, polyisoprene, polybutadiene, chlorinated polyethylene, polyalkyl acrylate, and polyalkyl methacrylate rubber, and a plurality of heat exchange tubes positioned in said heat exchange unit with said phase change material located between and around said heat exchange tubes to substantially fill any spaces between said heat exchange tubes, said tubes being in heat transfer relation to said phase change material and in fluid connection with said source of water so that the water heated by said heating element flows through said tubes and heats said phase change material and thereafter the heat stored in said phase change material is transferred through said tubes to water flowing therethrough at nearly constant temperatures equivalent to the freezing/melting temperature of said phase change material; wherein heating of said phase change material is initiated in the upper section of said heat exchange unit.

23. A water heater for heating water comprising:

a source of water, a top water reservoir and a bottom water reservoir;

a heating element for heating said water;

a heat exchange unit having an upper section and a lower section and outer walls, said heat exchange unit containing a phase change material therein comprising a linear crystalline alkyl hydrocarbon having a melting/freezing temperature from about 20° C. to 100° C., said phase change material including from about 2 to 10% by weight of a polymer selected from the group consisting of low density polyethylene, crystalline ethylene/propylene copolymers, ethylene/vinyl acetate copolymers, ethylene/methyl acrylate copolymer ethylene/methyl methacrylate copolymers, ethylene/glycol polymers, and polyethylene oxide; and a plurality of heat exchange tubes positioned in said heat exchange unit with said phase change material located between and around said heat exchange tubes to substantially fill any spaces between said heat exchange tubes, said tubes being in heat transfer relation to said phase change material and in fluid connection with said source of water so that the water heated by said heating element flows through said tubes and beats said phase change material and thereafter the heat stored in said phase change material is transferred through said tubes to water flowing therethrough at nearly constant temperatures equivalent to the freezing/melting temperature of said phase change material; wherein heating of said phase change material is initiated in the upper section of said heat exchange unit.

24. A water heater for heating water comprising:

a source of water, a top water reservoir and a bottom water reservoir;

a heating element for heating said water;

a heat exchange unit having an upper section and a lower section and outer walls, said heat exchange unit containing a phase change material therein comprising a linear crystalline alkyl hydrocarbon having a melting/freezing temperature from about 20° C. to 100° C., said phase change material including from about 5 to about 50% by weight of a metal selected from the group consisting of aluminum and copper, and a plurality of heat exchange tubes positioned in said heat exchange unit with said phase change material located between and around said heat exchange tubes to substantially fill any spaces between said heat exchange tubes, said tubes being in heat transfer relation to said phase change material and in fluid connection with said source of water so that the water heated by said heating element flows through said tubes and heats said phase change material and thereafter the heat stored in said phase change material is transferred through said tubes to water flowing therethrough at nearly constant temperatures equivalent to the freezing/melting temperature of said phase change material; wherein heating of said phase change material is initiated in the upper section of said heat exchange unit.

* * * * *

UNITED STATES PATENT AND TRADEMARK OFFICE
CERTIFICATE OF CORRECTION

PATENT NO. : 6,493,507 B2  Page 1 of 1
DATED : December 10, 2002
INVENTOR(S) : Ival O. Salyer It is certified that error appears in the above-identified patent and that said Letters Patent is hereby corrected as shown below:

Column 10,
Line 26, "tubes and beats" should be -- tubes and heats --

Signed and Sealed this

Eighteenth Day of March, 2003

JAMES E. ROGAN
*Director of the United States Patent and Trademark Office*